United States Patent
Partezana

(10) Patent No.: US 7,752,055 B1
(45) Date of Patent: Jul. 6, 2010

(54) SYSTEMS AND METHODS FOR DETERMINING A RETURN ON INVESTMENT FOR SOFTWARE TESTING

(75) Inventor: Chris A. Partezana, Paola, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 636 days.

(21) Appl. No.: 11/550,801

(22) Filed: Oct. 19, 2006

(51) Int. Cl.
G06Q 10/00 (2006.01)
G06Q 30/00 (2006.01)
G06F 17/00 (2006.01)
G06G 7/00 (2006.01)

(52) U.S. Cl. .................. 705/1.1; 705/400
(58) Field of Classification Search .............. 705/1, 705/1.1, 400
See application file for complete search history.

(56) References Cited

U.S. PATENT DOCUMENTS

2003/0040887 A1* 2/2003 Shupps et al. ............. 702/187
2004/0204972 A1* 10/2004 Anant et al. ................. 705/7

OTHER PUBLICATIONS

Farley, Kevin J. "Software testing: learn the craft of quality control. (includes related articles on cost of bugs, and software engineering with assertions) (tutorial)" Data Based Advisor, v11, n4, p80(3), Apr. 1993.*

* cited by examiner

Primary Examiner—John W Hayes
Assistant Examiner—Allen J Jung

(57) ABSTRACT

A method is provided for determining a return on investment for software testing. The method includes determining an average cost to correct software errors found in production. The method further includes classifying these software errors based on the size of the application and the size of the error and averaging the cost to correct the errors within each classification. The method additionally includes determining software faults during software testing and classifying these faults based upon the same classifications set forth for the software errors found in production. The method then requires transferring the average cost to correct production errors within each classification to each software fault found during testing with the same classification. The method additionally adds all of the average costs to correct the software errors for each software fault found during testing and subtracts the cost of the testing. The method concludes by displaying the result.

20 Claims, 5 Drawing Sheets

Fig. 7

| SOFTWARE NAME | | | | |
|---|---|---|---|---|
| NUMBER OF BUGS FOUND | 5 | | | |
| | SIZE OF BUG | SIZE OF SOFTWARE APPLICATION | CLASSIFICATION | AVG. COST FOR CLASSIFICATION |
| BUG 1 | LARGE | MEDIUM | L/M | $1 MILLION |
| 2 | MEDIUM | MEDIUM | M/M | $500K |
| 3 | SMALL | MEDIUM | S/M | $250K |
| 4 | MEDIUM | MEDIUM | M/M | $500K |
| 5 | SMALL | MEDIUM | S/M | $250K |
| | | | TOTAL COST AVOIDED | $2.5 MILLION |
| | | | COST OF TESTING | $250K |
| | | | TOTAL RETURN ON INVESTMENT | $2.25 MILLION |

SYSTEMS AND METHODS FOR DETERMINING A RETURN ON INVESTMENT FOR SOFTWARE TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application is computer software that employs the capabilities of a computer to perform a task for a computer user. Applications typically are tested by software test engineers prior to being certified ready for production. This testing is done to try and minimize problems that may occur after the application is in production, which would cost the user time and money.

Software testing is expensive. There is a need to determine a quantifiable return on investment for software testing to help managers make decisions on how much testing should be done or whether certain types of testing should be done at all. Currently, software testing is performed because there is a consensus in industry that software testing is a good thing in trying to keep applications running and customers happy. Until now, however, there has not been a consistently and effectively applied approach to analyze the return obtained by investing in testing compared with the cost of testing.

SUMMARY

Accordingly, there is disclosed herein various systems and methods for determining a return on investment for software testing. Some method embodiments include determining an average cost to correct software errors found in production. The average cost to correct these software errors is calculated using impacted user minutes. The impacted user minute ("IUM") cost is calculated by determining the number of affected users when an error occurs, determining the number of minutes an application is down due to the software error, determining the percent of the application that is impacted, determining the average pay per minute of employees affected by the down time, and multiplying these numbers together. The method further includes classifying these software errors based on the size of the application and the size of the error within the application. The method additionally includes averaging the IUM cost within each classification.

Other method embodiments provide an analysis of software faults found during software testing. These software faults are classified based on application size and fault size, using the same classification system as used when classifying the software errors found during production. The method may further include transferring the average cost of impacted user minutes for each classification, calculated using production errors, to each software fault found during testing with the same classification. Some method embodiments further include adding all of the average costs of impacted user minutes for each software fault found during testing and subtracting the cost of the testing. The method may conclude by displaying the result to the user.

According to some system embodiments, a system for determining a return on investment for software testing is provided. The system includes a configuration component, a storage component, an analysis component, and a graphical display interface component. The configuration component is operable to average the cost of correcting software errors in production using one of the method embodiments previously described. The storage component is operable to store the software faults found during software testing. The analysis component is operable to calculate the return on investment using the data in the database component and the information from the system component with the preferred method described above. The graphical display interface component displays the result to the user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 7 shows a depiction of how the results are displayed to a user

DETAILED DESCRIPTION

It should be understood at the outset that although various illustrative embodiments are shown below, the present system may be implemented using any number of techniques, whether currently known or in existence. The present disclosure should in no way be limited to the exemplary implementations, drawings, and techniques illustrated below, but may be modified within the scope of the appended claims along with their full scope of equivalents.

With the increasing cost of software testing, there are advantages in a concrete and repeatable approach to analyze the need for testing and the amount of testing to be done. The present disclosure provides an infrastructure for implementing and managing systems and methods for determining a return on investment for software testing. The systems and methods described herein provide a quantifiable way to measure the value of software testing, thus enabling managers to make knowledgeable decisions regarding the amount of testing to be conducted. Through determining a return on investment of the software testing, the business managers have a reliable tool to determine the value of their testing in terms of the amount of money the business is saved by fixing errors prior to production.

Figure 1:
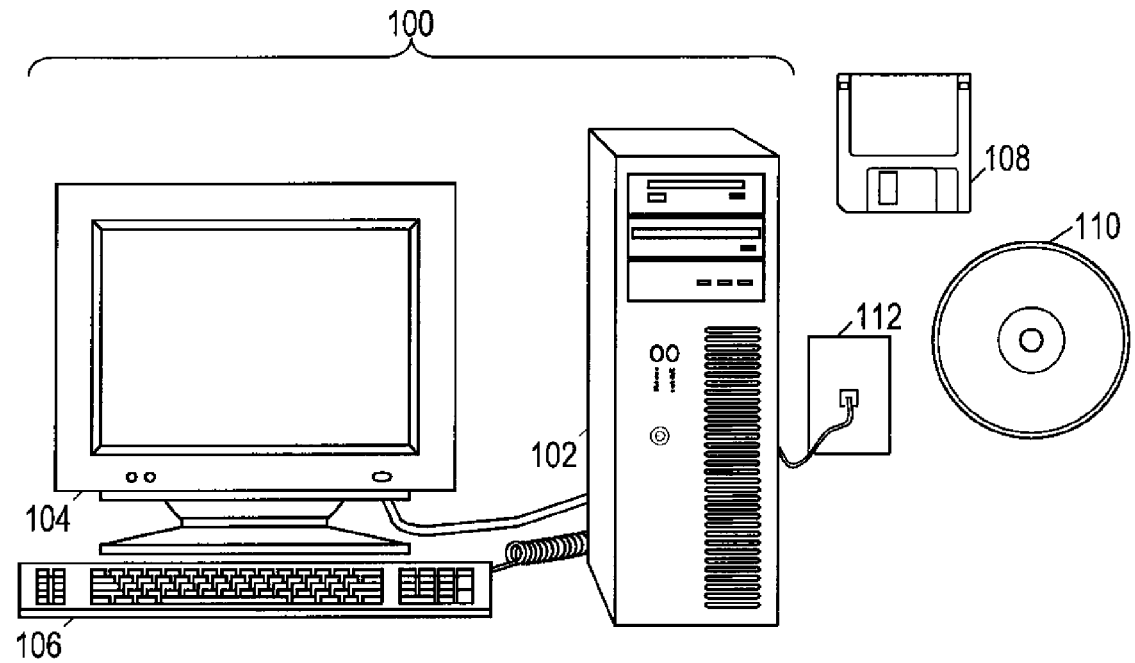
FIG. 1 shows a system for determining return on investment for software testing embodied as a desktop computer.

FIG. 1 shows a system 100 for determining a return on investment for software testing. System 100 is shown as a desktop computer 100, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The processor retrieves software and cost data from one of the information storage devices (or via the network interface) to enable analysis of return on investment (ROI) for software testing.

The chassis 102 is coupled to the display 104 and the input device 106 to enable the user to interact with the testing ROI software. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102. A block of system 100 is provided in FIG. 2 and discussed at the end of this disclosure.

Figure 3:
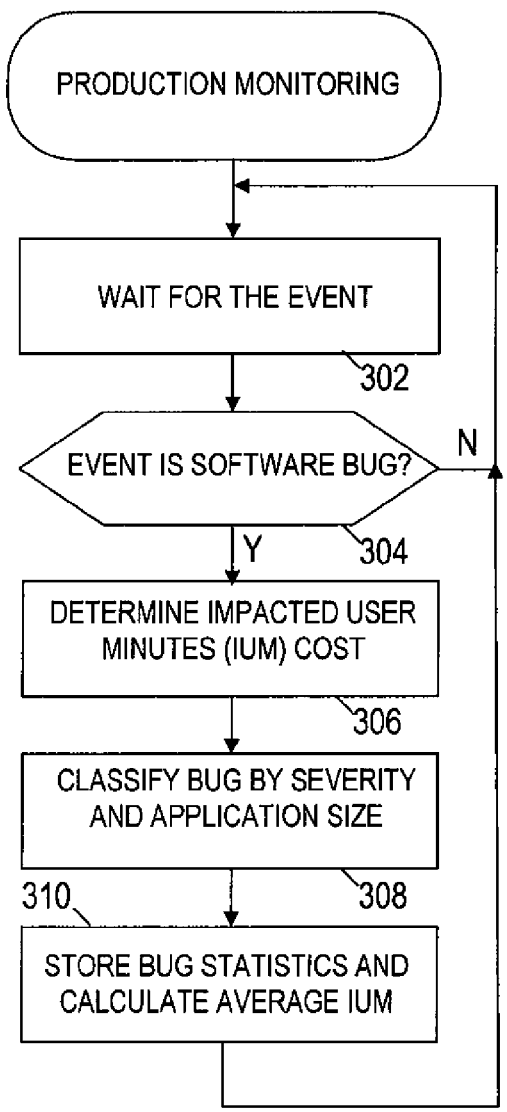
FIG. 3 is a flow diagram of a method for determining an average cost for impacted user minutes for different classifications of errors found during production.

FIG. 3 shows a method that may be implemented by system 100 to determine the average impacted user minute cost for a software error found during production that may be implemented by system 100. The method comprises five phases: waiting for the event 302, determining whether the event is a software error ("bug") 304, determining the cost of impacted user minutes for each software bug 306, classifying each software bug based on the software application's size and the size of the bug 308, and storing the bug statistics and calculating an average impacted user minute ("IUM") cost for all bugs in each classification 310. The method begins in block 302, where the user of the method waits for an event to occur. While the software application is in production, it is monitored to ensure that it is working correctly. Production is the time when the software application certified for full use by an enterprise in support of its commercial operations. If any error occurs in the system that the application operates in, then the method of FIG. 3 continues.

In block 304, the user must determine whether the error that occurred was due to a software bug or some other reason, i.e. hardware problems. If the event was not caused by a software bug, then the user will again monitor the system and wait for another event to occur. However, if the event is determined to be caused by a software bug, the method continues by determining the IUM cost in block 306.

In block 306, the cost of impacted user minutes is calculated when a bug is detected after the software is put into production. Whenever a bug occurs during production, the users of the application have limited access or ability to use the software, thus affecting their ability to perform required work and thus impairing a company's commercial efficiency. This means that the users are being paid a salary, yet are not able to do their work at full capacity because the software application they need is not working correctly. In this embodiment, the cost of this lost work to the company is calculated using the salary paid to employees and their lost ability to work efficiently due to the software bug. Alternative embodiments may use different criteria to determine the cost of the lost work, including, but not limited to, loss of business.

In block 308, each bug in production is classified based on the application size and the bug size. In this embodiment, nine different classifications are used; however, more or less may be used in other embodiments. Each application is classified into one of three sizes: small, medium, and large. Each bug size, based on the size of the error to be corrected, is also classified as being small, medium, or large. This allows for the nine separate classifications: Large/Large (LA), Large/Medium (UM), Large/Small (US), Medium/Large (MIL), Medium/Medium (MIM), Medium/Small (MIS), Small/Large (SIL), Small/Medium (SIM), and Small/Small (SIS).

In block 310, for every classification 308, the cost of impacted user minutes 306 is averaged. For instance, the cost of the impacted user minutes 306 for every bug in the UL classification 308 is averaged. This gives an average cost in terms of impacted user minutes for any one bug found to be an UL bug and can be used to approximate future impacted user minute costs for future bugs found in production. The bug statistics for each bug is then stored so that these statistics can be used to help calculate a return on investment for software testing.

Figure 4:
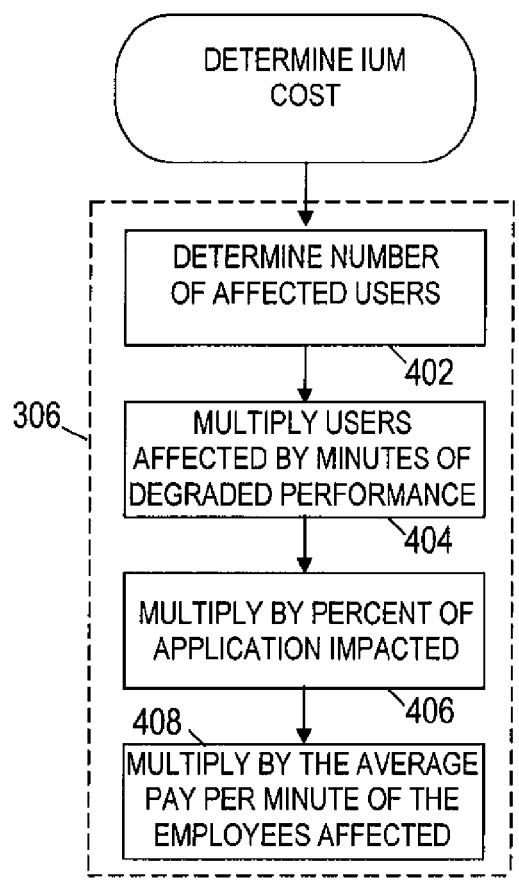
FIG. 4 is a flow diagram of a method for determining the cost of impacted user minutes.

FIG. 4 shows a method for determining the cost of impacted user minutes 306 for any bug in production. The method comprises four phases: determining the number of affected users 402, multiplying the number of affected users by the number of minutes the application is down 404, multiplying by the percent of the application that is impacted 406, and multiplying by the average per minute salary of the employees affected 408. The method begins with block 402, in which the number of affected users is determined. When a software application bug occurs in production, a certain number of employees will need the software to perform their jobs. The average number of these employees impacted by the bug during the minutes the error causes lost performance is counted in block 402. For instance, if an average of 50 employees needs to use the application to perform their jobs correctly during the minutes the bug causes errors, then the number of affected users 402 is 50.

Block 404 requires the multiplication of the number of users impacted 402 by the number of minutes down. The bug will cause a certain part of the application to not work correctly for a certain amount of time, sometimes called "down time". This amount of time during which an application is down or is suffering from degraded performance is expressed in minutes, which may require conversion if it was originally in another unit, such as days or hours. This number is then multiplied by the number of users from 402. To continue the example from above, if block 402 is 50 and the down time is 30 minutes, then in block 404, 50 is multiplied by 30 with 1500 user minutes being the result.

Block 406 requires the multiplication of the result from block 404 by the percent of the application impacted. When a bug exists in the application, it may affect only a portion of the application, or degrade the applications performance so that the application can be used, but not at full capacity. By taking into consideration the percentage of the application impacted, the cost of impacted user minutes 306 is much more accurate as to how much the employees really were affected. Block 306 takes into account how much work the employees could not actually do because of the bug in the application. The result of block 406 is the impacted user minutes. Using the same numbers from the above example, if only 20% of the software application is affected, then 1500 user minutes is multiplied by 0.20. This gives a result of 300 user minutes lost due to the bug.

Finally, in block 408, the impacted user minutes 406 is multiplied by the average per minute salary of the affected employees. Each effected employee is accounted for and each of their salaries is accounted for in calculating a per minute salary. An average of these per minute salaries is then calculated. The result of block 408 is the cost of impacted user minutes 306. This shows how much a company loses in terms of paying an employee a salary for work that they cannot do because of a software bug. To finish the above example, if the average employee affected by the software bug is paid $10 per hour, the average per minute salary would be $0.17 per minute. Block 408 requires this per minute salary to be multiplied by the result from block 406, $0.17 times 300 with a result of $50. Therefore, in this example, $50 is the calculated cost for impacted user minutes 306 for a particular software bug found in production.

Figure 5:
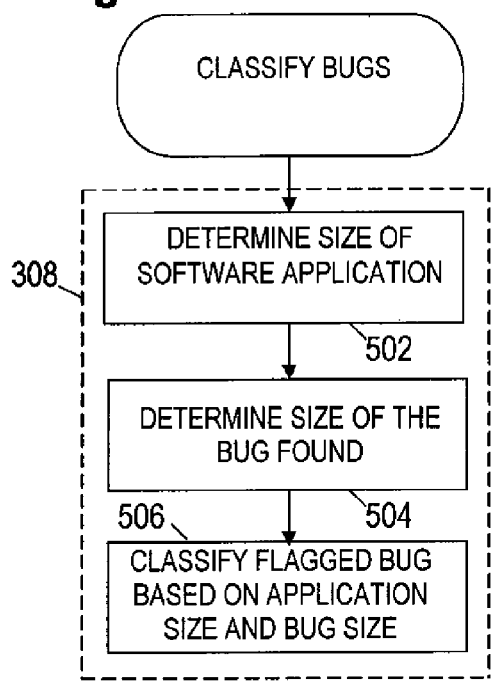
FIG. 5 is a flow diagram of a method for determining a return on investment for software testing.

FIG. 5 shows a method for classifying bugs found in production. The method consists of three phases: determining the size of the software application 502, determining the size of each bug that is found 504, and classifying each flagged bug based on application size and bug size 506. This method is the preferred method for determining block 308. For example, in block 502 the classification of the application may be based, but is not limited to the number of users who use the application on a daily basis. The large classification for application size could be if more than 1000 users use the application everyday. The medium classification could be if more than 500 users but 1000 or less users use the application daily. The small classification could be if 500 or less users use the application daily. For instance, using the present example numbers, if an application had an average daily use of 800 users, the application size would be deemed medium.

In block 504, for each software application bug found, the size of the bug is needed to classify the bug. In the preferred embodiment, the sizes are small, medium, and large. The classifications for bug size could be based on the amount of time needed to correct the bug. The large classification for bug size could be if it takes more than 72 hours to correct the bug. The medium classification could be if it takes more than 10 hours but 72 hours or less to correct the bug with the small classification being 10 hours or less to correct. Thus, in this example, if the bug takes 24 hours to correct, it would be classified as a medium bug.

The bugs are then classified based on the application size 502 and the bug size 504 in the format of: UL, UM, US, MIL, M/M, MIS, SIL, SIM, SIL. Using the above example numbers, if an error occurs and it affects an application that is used by 800 users daily and takes 24 hours to correct, then the classification of the bug would be Medium/Medium (M/M).

Figure 6:
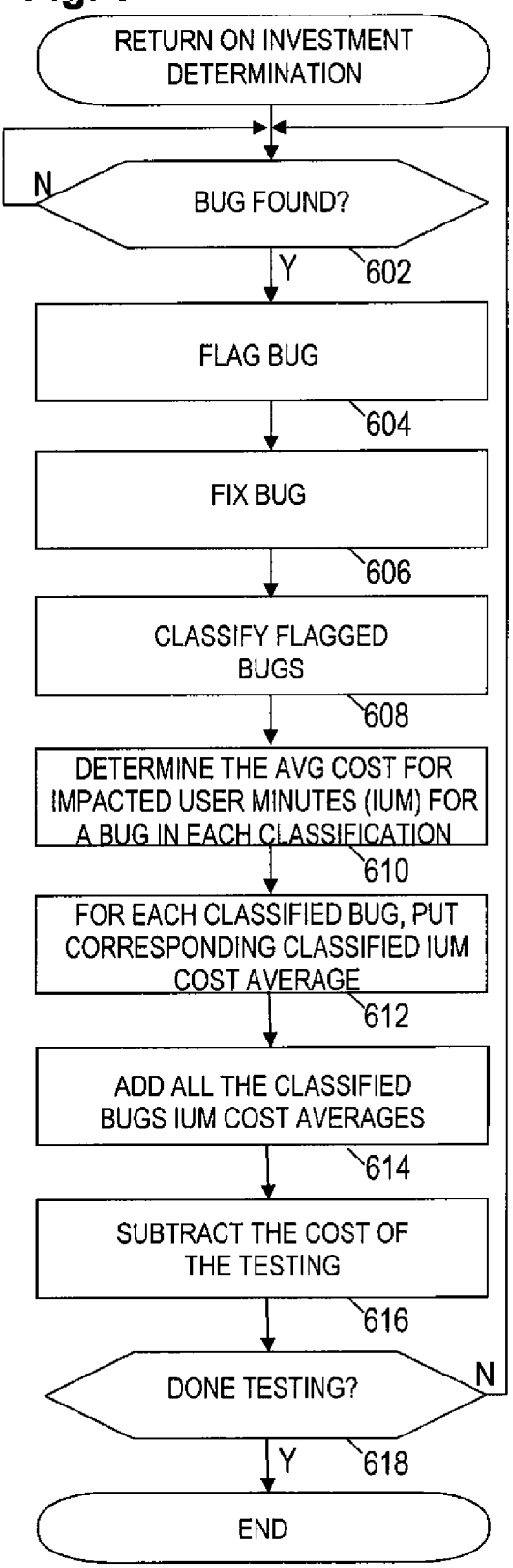
FIG. 6 is a flow diagram of a method for classifying software faults found during software testing.

FIG. 6 depicts a method for determining the return on investment for software testing that may be implemented using system 100. Alternative embodiments which consider loss of business may also be implemented. The method has nine steps: determining if a bug exists during software testing 602, flagging every bug that is detected 604, fixing every bug that is detected 606, classifying every flagged bug 608, determining the average cost for the impacted user minutes for a bug in each classification 610, transferring the average cost of impacted user minutes for a bug in each classification 510 to each bug found in testing in the corresponding classification 612, adding all of the classified bugs found in testing impacted user minutes cost averages 614, subtracting the cost of the testing 616, and determining if the testing for the software is complete 618. The method begins in block 602 where bugs are detected. This process takes place in the software testing environment. The objective of software testing is to find any bug that is in the software and fix the problem so that it will not occur during production. Therefore, block 602 requires the determination of whether there is a bug anywhere in the software.

If a bug is found, then the bug is flagged 604. This means that a record of the bug may be kept by system 100. The size of the bug and the size of the application being tested are all recorded for future use in the return on investment calculations. This enables the testing to continue without slowing the testing process while at the same time keeping accurate records of bugs found during testing.

Block 606 requires that the bug found during testing be fixed so that when the application goes into the production environment, the bug will not affect the application.

Each bug found during the testing is classified in step 608 using the same classifications found in step 308. Alternatively, a sample of the bugs may be classified. This means that both the software application and the detected bugs are classified by the small, medium, and large designations. The same nine possible classifications are present in step 608 as in step 308: UL, UM, US, MIL, MIM, MIS, SIL, SIM, SIS. More or less classifications may be used, as long as the classifications are the same as those in step 308. The preferred embodiment uses the same classification method presented in FIG. 5.

In block 610, the average cost for impacted user minutes for a bug in each classification is determined. In the preferred embodiment, the method of FIG. 3 is used to calculate this average, although other ways may be used. This average will require data from previous bugs detected and fixed during production.

Block 612 requires using the average calculated in block 610 for each classification and placing that number with each bug detected during testing having the same classification. For instance, if the average cost for impacted user minutes for a bug in the UL classification is $2 million, then $2 million is assigned to each bug detected during testing in the UL classification.

In block 614, for every bug found in testing, the dollar amounts assigned to them in step 612 are added. This dollar amount represents the amount of money that it would have cost the company, in terms of salary paid to employees for work that could not be completed due to software bugs, had the testing not taken place and the bugs not corrected prior to the production phase of the software.

In block 616, the total cost of completing the testing for the application that is being tested is subtracted from the cost savings found in block 614. The cost for testing may include not only the cost for testing personnel and infrastructure, but may also include lost revenue due to delays in putting the software into production. The difference between total cost avoided and the cost of testing is the total return on investment as it represents the amount of money saved due to the testing, yet includes the amount of money spent on conducting the testing.

In block 618, it must be determined if the testing is complete. If it is determined that the testing is not complete, then the process of FIG. 6 begins again in block 602. However, if the testing is determined to be complete, the method of FIG. 6 will be complete with a total return on investment calculated for the testing completed on the software.

FIG. 7 is an illustrative embodiment of how the results of the return on investment for software testing analysis might be displayed to the user by system 100. The display may state the name of the software that has been tested. The illustrative display also states the total number of bugs found during the testing process. Each individual bug is shown along with the size of each bug and the size of the software application being tested. The classification of each bug is shown along with the corresponding average cost for impacted user minutes for each classification. The average costs are all added up giving the total cost avoided which is shown below the average costs. The cost of the testing is shown and subtracted from the total cost avoided giving the total return on investment which is shown to the user on the bottom right hand part of the device.

Figure 8:
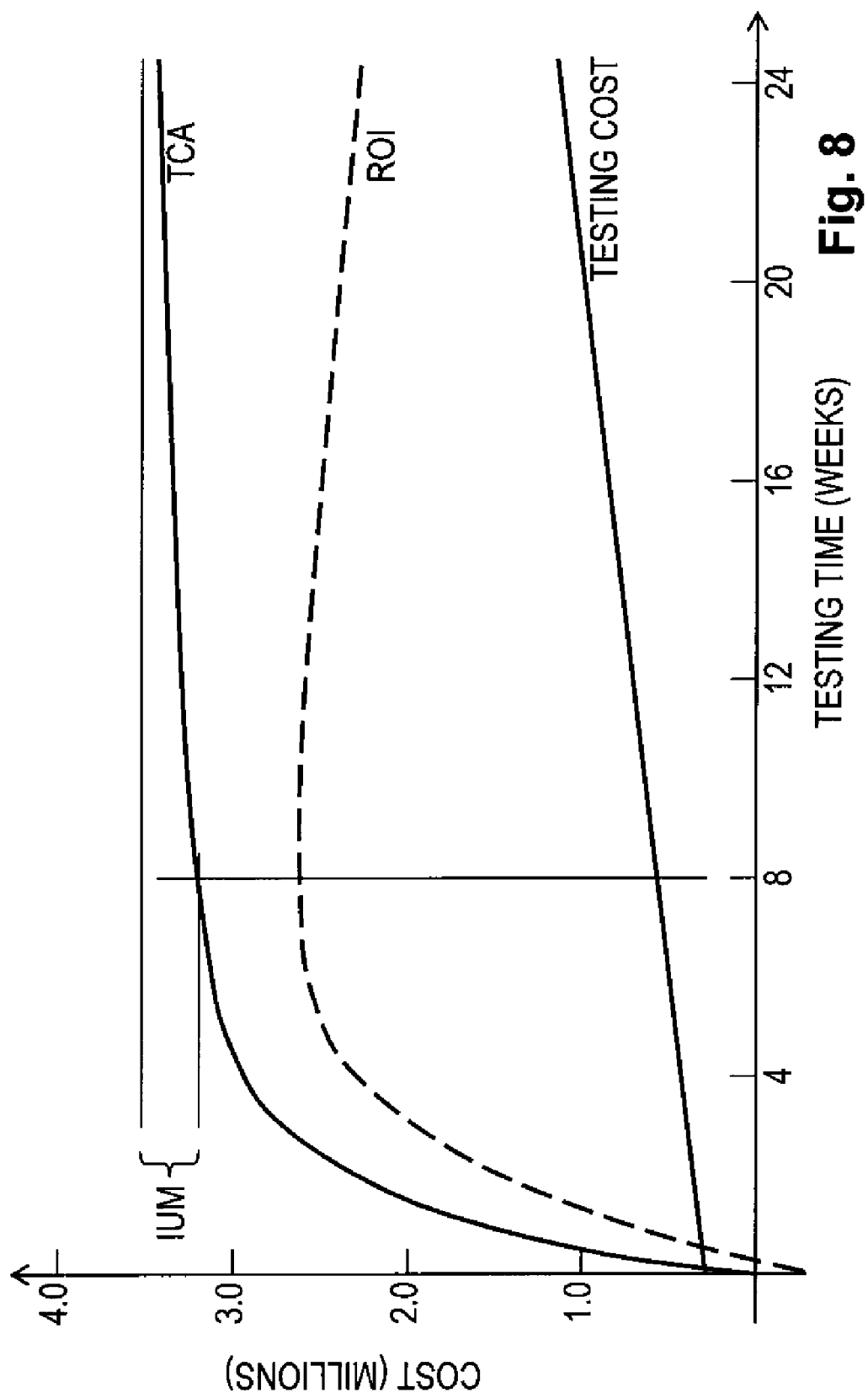
FIG. 8 shows an illustrative graph of average total cost avoided and average testing cost as a function of testing time.

It is noted that the total cost avoided and the cost of testing can be tracked as a function of testing time. Alternatively, the number and classifications of bugs identified as a function of time can be tracked. If such parameters are gathered for a number of comparable software projects, a graph or chart of the average parameter value as a function of time can be determined. For example, FIG. 8 shows an illustrative graph of average total cost avoided (TCA) and average testing cost as a function of testing time. A dashed line is also shown for the return on investment (ROI) that represents the difference between the average TCA and the average testing cost.

In addition to gathering and reporting such statistics, the software may provide predictions for TCA for new software projects as a function of testing time. When combined with estimates of testing cost as a function of testing time, the software may provide a user with a suggested duration for software testing. Moreover, the software may show the consequences of deviating from the suggested duration.

Managers having access to such software can readily determine an optimal testing time and the probable consequences of deviating from the optimal testing time. For instance, in the example of FIG. 8, the maximum ROI occurs with eight weeks of testing time. However, the ROI remains relatively close to this value within the six-to-ten week region, indicating that in this zone of testing time, increases in the total cost avoided are largely offset by increases in testing cost. Thus, a manager may elect to lengthen the testing time to ten weeks to minimize customer dissatisfaction, with a very small reduction in ROI as the tradeoff. Alternatively, a manager may be pressured to shorten the testing time to four weeks to save $250,000 in testing cost, and with this data the manager can predict that the consequences of such a shortened impact will be a quantifiable increase in (average) IUM cost from $350,000 to over $700,000.

Figure 2:
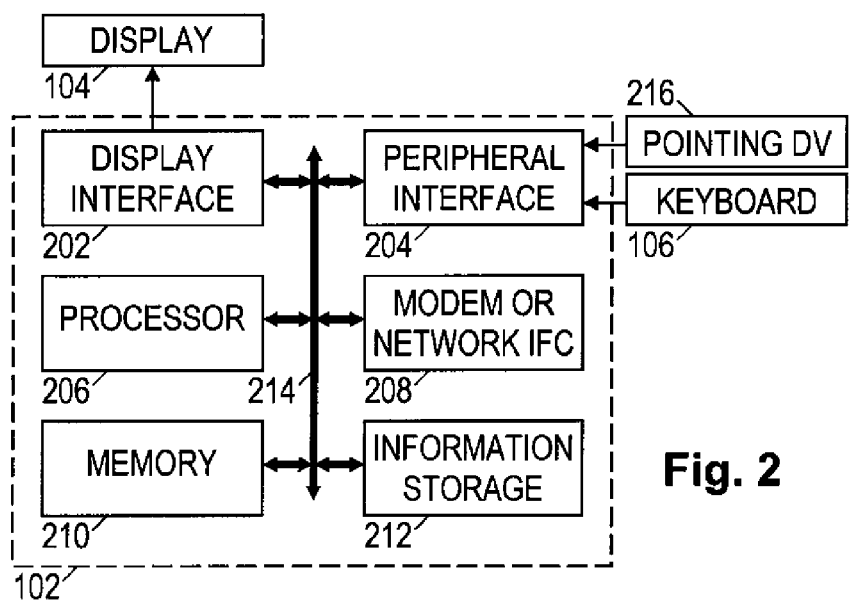
FIG. 2 shows a block diagram of the return on investment system.

FIG. 2 shows a simplified functional block diagram of system 100. The chassis 102 may comprise a display interface 202, a peripheral interface 204, a processor 206, a modem or other suitable network interface 208, a memory 210, an information storage device 212, and a bus 214. System 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, including input data from the peripheral interface 204, and program instructions and other data from the memory 210, the information storage device 212, or from a remote location via the network interface 208. The processor 206 carries out the program instructions and processes the data accordingly. The processor includes a configuration component and an analysis component each able to make calculations based on the program instructions. The program instructions may further configure the processor 206 to send data to other system elements, comprising information for the user which may be communicated via the display interface 202 and the display 104.

The processor 206, and hence the computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from information the storage device 212 or may be retrieved from remote locations via the network interface 208. One or more of these programs configures system 100 to carry out at least one of the return on investment measurement methods disclosed herein.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for determining a return on investment for software testing, comprising:

determining a plurality of software faults, wherein said software faults are found during software testing;

classifying, with a return on investment calculator stored as a set of computer readable instructions on a computer readable storage media and executable by a processor, each of the plurality of software faults into one of a plurality of categories;

determining, with the return on investment calculator, an average cost to correct software errors in production for each of the plurality of categories;

determining a cost of testing the software;

calculating with the return on investment calculator the return on investment for the software testing by transferring the average cost of correcting a software error in production for one of the plurality of categories of software errors to each software fault found during software testing with a corresponding categorization, adding the transferred average cost of correcting a software error in production for all of the software faults found during testing to a cost avoided, and subtracting the cost of testing the software from the cost avoided.

2. The computer implemented method of claim 1, wherein said average cost to correct the software errors in production is calculated using cost of impacted user minutes.

3. The computer implemented method of claim 2, wherein the cost of impacted user minutes comprises:
   determining with the return on investment calculator a number of affected users when an error occurs;
   determining with the return on investment calculator a number of minutes an application is down due to the software error;
   determining with the return on investment calculator a percent of the application that is impacted; and
   determining with the return on investment calculator an average pay per minute of employees affected by the down time.

4. The computer implemented method of claim 2, wherein the software errors in production are classified based on the application size and the software error size.

5. The computer implemented method of claim 4, wherein within each said classification, an average of the cost of impacted user minutes is calculated.

6. The computer implemented method of claim 5, wherein the software faults are classified based on the application size and the software fault size.

7. The computer implemented method of claim 6, wherein the software fault classifications are the same as the software error classifications.

8. The computer implemented method of claim 7, wherein the average cost of impacted user minutes for each classification of software errors is transferred to each software fault with the same classification.

9. The computer implemented method of claim 8, wherein for all the software faults, the average cost of impacted user minutes is added to a cost avoided, and the cost of testing the software is subtracted from the cost avoided to determine the return on investment.

10. A computer implemented system for determining a return on investment for software testing, comprising:
    a processor; and
    at least one non-transitory computer-readable medium comprising one or more programs executable by the processor, the at least one non-transitory computer-readable medium comprising:
       a configuration component including program instructions that configure the processor to calculate an average cost of correcting a software error in production by category of software error for a
    plurality of categories of software errors and including program instructions that configure the processor to determine a cost of testing the software;
    a storage component that stores data, wherein the data comprises software faults found during software testing; and
    an analysis component including program instructions that configure the processor to calculate the return on investment for the software testing by transferring the average cost of correcting a software error in production for one of the plurality of categories of software errors to each software fault found during software testing with a corresponding categorization, adding the transferred average cost of correcting a software error in production for all of the software faults found during testing to a cost avoided, and subtracting the cost of testing the software from the cost avoided.

11. The computer implemented system of claim 10, wherein the configuration component further:
    includes program instructions that configure the processor to determine said average cost to correct the software errors in production using cost of impacted user minutes.

12. The computer implemented system of claim 11, wherein the cost of impacted user minutes comprises:
    the number of affected users when an error occurs;
    the number of minutes an application is down due to the software error;
    the percent of the application that is impacted; and
    the average pay per minute of employees affected by the down time.

13. The computer implemented system of claim 12, wherein the configuration component further:
    includes program instructions that configure the processor to classify the software errors in production into categories of software errors based on the application size and the software error size; and
    includes program instructions that configure the processor to average the cost of impacted user minutes within each said category.

14. The computer implemented system of claim 13, wherein the storage component further:
    includes program instructions that configure the processor to classify the software faults into categories of software faults based on the application size and the software size, wherein said software fault categories are the same as said software error categories.

15. The computer implemented method of claim 1, further comprising:
    determining a time length for testing an application that results in a maximum return on investment.

16. The computer implemented method of claim 1, further comprising:
    determining for a given software project a prediction of total cost avoided (TCA) as a function of software testing time;
    receiving a prediction of testing cost as a function of software testing time; and
    providing a user with a suggested duration for software testing of the given software project.

17. The computer implemented method of claim 16, further comprising:
    receiving an alternative duration for software testing; and
    displaying a consequential change in predicted TCA.

18. The computer implemented method of claim 16, wherein the prediction of TCA is based on impacted user minutes for past software projects of a similar size.

19. The computer implemented method of claim 18, further comprising:
    compiling statistics of bugs detected in past software projects, along with an impacted user minute cost for each bug, wherein compiling statistics further comprises one of receiving and determining classifications of bug severity and project size.

20. The computer implemented system of claim 10, wherein the transferred average cost of correcting a software error in production comprises an average cost of impacted user minutes.

* * * * *